Dec. 5, 1944.  W. OCHSENBEIN  2,364,385

SNAP COUPLING, PARTICULARLY FOR MULTIPOLE MAGNETOS

Filed June 12, 1943

INVENTOR
Walter Ochsenbein

ATTORNEY

Patented Dec. 5, 1944

2,364,385

UNITED STATES PATENT OFFICE

2,364,385

SNAP COUPLING, PARTICULARLY FOR MULTIPOLE MAGNETOS

Walter Ochsenbein, Berne, Switzerland, assignor to Hasler A.-G. Werke für Telephonie und Präzisionsmechanik, Berne, Switzerland Application June 12, 1943, Serial No. 490,705
In Switzerland February 2, 1942

1 Claim. (Cl. 171—209)

The present invention relates to a snap coupling particularly for multipole magnetos in internal combustion engines and comprising two portions mutually rotatable to a limited degree, one of these portions being intended to be connected with the rotor of the magneto and the other with the motor shaft.

In certain arrangements of such kind known heretofore helical springs have been used for the connection between the carriers of the said two portions which springs at their release supported the starting momentum of the magnetic field of the magneto.

It has been found however that with helical springs not always the same chosen springs would answer in the case of magnetos of different sizes and that according to the present invention torsional-spiral springs will give far better results.

Figure 1:
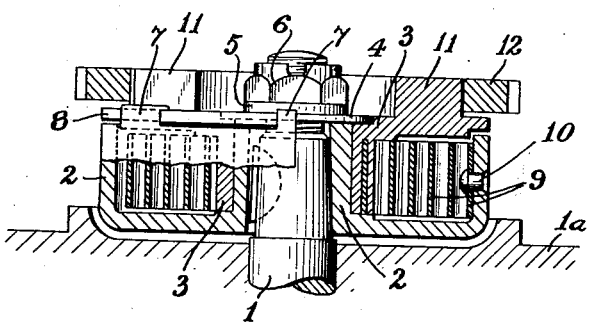
Figure 2:
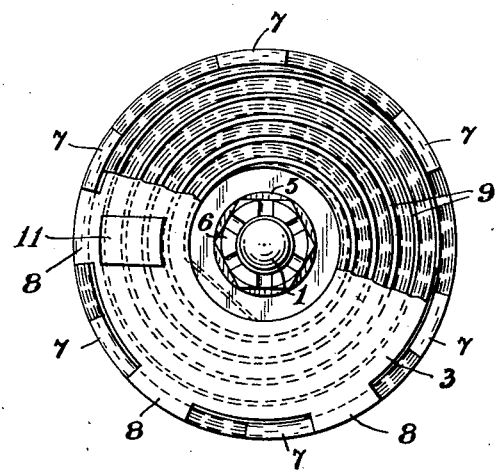
Figure 3:
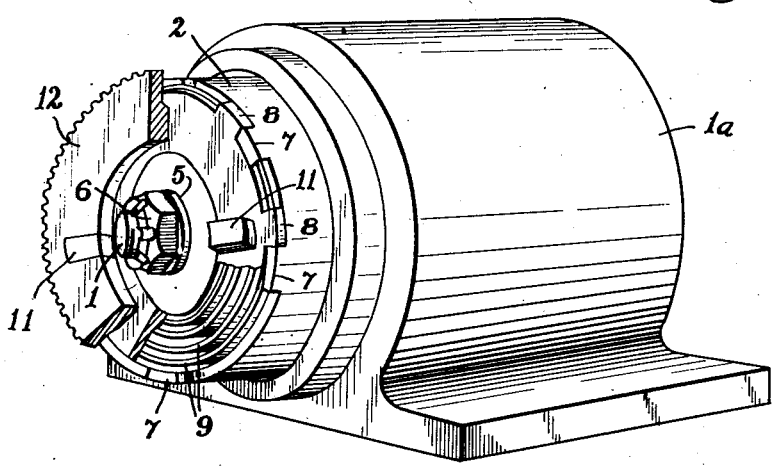

In the accompanying drawing one example of the improved snap coupling according to the present invention has been represented in Fig. 1 by an axial section across the coupling, in Fig. 2 by a top view after removal of some upper coupling parts, and in Fig. 3 by a perspective view of the snap coupling device according to the present invention.

1 designates the shaft of a multipole magneto 1a, 2 the coupling portion rigidly attached to this shaft, and 3 the other coupling portion rotatably arranged with regard to the first.

This rotatable portion is rotatably fitted with its cylindrical hub 3' to the hub 2' of the coupling portion 2, hub 2' having likewise a cylindrical outside. By means of two washers 4 and 5 and the screw nut 6 the two coupling portions 2 and 3 are held together. Coupling portion 2 is provided at its upper outer border with a number of upward directed teeth 7 which are in gear with a certain lateral play with teeth 8 projecting outwardly from the border of the coupling portion 3. The two coupling portions 2 and 3 may therefore be mutually distorted to the amount of said play. In the cavity formed by the two coupling portions is lodged a flat spiral torsional spring 9 the inner end of which is clamped fast in a slot of the hub 3' and the outer end is fastened to the coupling portion 2 by means of a rivet 10. Coupling portion 3 is held by the effect of the spiral spring in contact with its teeth to the teeth of coupling portion 2. The coupling portion 3 possesses on its upper face two carrier tappets 11 serving as coupling means between the gear wheel 12 geared to the motor shaft of the combustion engine and the coupling portion 3.

The working of the described snap coupling is as follows:

Coupling portion 3 must be rotated when the motor has to be started. Thereby coupling portion 3 is distorted in direction of the arrow and in relation to coupling portion 2 retained by the magnetic torque, while at the same time the already bent spring 9 is bent still more until the teeth 7 and 8 come into contact with those faces otherwise separated when at rest, whereupon in spite of any further torque the tension of the spring remains the same. After a turn of the coupling portion 2 through an angle corresponding to half a pole division of the motor the torque caused by magnetic field of the generator and acting hitherto like a brake changes its value and will have an accelerating effect upon the motor and thereby upon the coupling portion 2 whereby it is supported by the now unbending spring 9, so that the rotor receives a partial rotation of a sufficient speed for creating the first spark.

With the size of the magneto also the strength of the magnetic field will be changed and therewith also the power of the starting resistance. By adjusting the coupling portion 3 in relation to portion 2 the initial bending strain of the spring 9 may be changed, that is that it be adapted to the amount of the starting momentum of the magneo rotor. The described snap coupling may therefore as compared to the known couplings be used without changing of the spring for a stronger or a weaker one for magnetos of all sizes.

What I claim is:

In a snap coupling for connecting the rotor shaft of a multipole magneto with a shaft of an internal combustion engine, the combination with two coupling portions rotatable relative to one another, one of said portions being fast on said rotor shaft of the magneto and the other portion being operatively connected with said shaft of said internal combustion engine, of a torsional spring connecting said two coupling portions, and a plurality of circumferentially spaced teeth on each of said portions, the teeth on one of said portions meshing with those on the other portion with a predetermined lateral play, whereby the two coupling portions can be angularly adjusted relative to one another so as to give said torsional spring any desired initial tension.

WALTER OCHSENBEIN.